United States Patent
Fujita

(10) Patent No.: US 8,258,226 B2
(45) Date of Patent: Sep. 4, 2012

(54) COMPOSITION FOR MANUFACTURING HEAT RAY-SHIELDING POLYVINYL CHLORIDE FILM AND MANUFACTURING METHOD OF THE SAME, AND HEAT RAY-SHIELDING POLYVINYL CHLORIDE FILM

(75) Inventor: Kenichi Fujita, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 205 days.

(21) Appl. No.: 12/450,963

(22) PCT Filed: Apr. 23, 2008

(86) PCT No.: PCT/JP2008/057802
§ 371 (c)(1),
(2), (4) Date: Feb. 4, 2010

(87) PCT Pub. No.: WO2008/136317
PCT Pub. Date: Nov. 13, 2008

(65) Prior Publication Data
US 2010/0140533 A1 Jun. 10, 2010

(30) Foreign Application Priority Data
Apr. 26, 2007 (JP) ................................ 2007-117019

(51) Int. Cl.
*C08K 3/10* (2006.01)
(52) U.S. Cl. ............................ 524/406; 252/62; 428/340
(58) Field of Classification Search .................... 524/406
See application file for complete search history.

(56) References Cited

U.S. PATENT DOCUMENTS
2008/0160299 A1 * 7/2008 Mori et al. .................... 428/340

FOREIGN PATENT DOCUMENTS

| EP | 1 640 348 A1 | 3/2006 |
|---|---|---|
| EP | 1 676 890 A1 | 7/2006 |
| JP | A-2-173060 | 7/1990 |
| JP | A-5-78544 | 3/1993 |
| JP | A-6-256541 | 9/1994 |
| JP | A-6-264050 | 9/1994 |
| JP | A-8-217908 | 8/1996 |
| JP | A-2003-327717 | 11/2003 |
| JP | A-2004-59875 | 2/2004 |
| JP | A-2006-132042 | 5/2006 |
| JP | A-2006-154516 | 6/2006 |
| JP | A-2006-199850 | 8/2006 |
| JP | A-2006-219662 | 8/2006 |
| JP | A-2006-231869 | 9/2006 |

OTHER PUBLICATIONS

Jul. 22, 2008 International Search Report issued in International Application No. PCT/JP2008/057802 (with translation).
European Search Report issued in Application No. 08 751 940.1; dated Oct. 29, 2010.

* cited by examiner

*Primary Examiner* — Doris Lee
(74) *Attorney, Agent, or Firm* — Oliff & Berridge, PLC

(57) ABSTRACT

A composition for manufacturing a heat ray-shielding polyvinyl chloride film by the steps of obtaining a dispersion liquid by dispersing tungsten oxide nanoparticles expressed by a general formula $WO_x$ and/or the composite tungsten oxide nanoparticles expressed by a general formula $M_yWO_z$ and having a hexaboride crystal structure, and a dispersant, into an organic solvent; obtaining a mixture by mixing a plasticizer for manufacturing a polyvinyl chloride, into this dispersion liquid; and obtaining a composition for manufacturing the heat ray-shielding polyvinyl chloride film by using a vacuum distillation method and removing the organic solvent from this mixture until a concentration of the solvent is 5 wt % or less.

18 Claims, No Drawings

COMPOSITION FOR MANUFACTURING HEAT RAY-SHIELDING POLYVINYL CHLORIDE FILM AND MANUFACTURING METHOD OF THE SAME, AND HEAT RAY-SHIELDING POLYVINYL CHLORIDE FILM

TECHNICAL FIELD

The present invention relates to a composition for manufacturing a heat ray-shielding polyvinyl chloride film and a manufacturing method of the same, applied to a polyvinyl chloride film having excellent visible light transmittance and having an excellent heat ray-shielding function, and further relates to a heat ray-shielding polyvinyl chloride film to which the composition for manufacturing a heat ray-shielding polyvinyl chloride film is applied.

DESCRIPTION OF RELATED ART

Solar rays incident from a so-called opening part such as windows and doors of various buildings and vehicles, include ultraviolet rays and infrared rays in addition to visible light. A near infrared ray having wavelengths of 800 to 2500 nm out of the infrared rays included in the solar rays, is called a heat ray and this heat ray causes a temperature in a room to increase when it enters into the room from the opening parts. In order to solve such a state, in recent years, in a field of a window material of various buildings and vehicles, a demand for a heat-ray shielding molding capable of shielding the heat ray while sufficiently capturing the visible light and suppressing temperature increase in the room while maintaining brightness, has been increased rapidly, and many patents regarding the heat-ray shielding molding have been proposed.

For example, a heat ray-shielding plate, wherein a heat ray reflection film formed by depositing a metal and a metal oxide on a transparent resin film, is bonded to a transparent molding such as glass, acrylic plate, and polycarbonate plate, is proposed.

Also, for example, a plurality of heat ray shielding plates formed by directly depositing the metal or the metal oxide on the surface of the transparent molding are proposed.

In addition, for example, a heat ray shielding plate and a film (see patent documents 1 and 2) wherein an organic near infrared ray absorbent agent represented by a phthalocyanine-based compound and an anthraquinone-based compound is kneaded with thermoplastic transparent resin such as polyethylene terephthalate resin, polycarbonate resin, acrylic resin, polyethylene resin, and polystyrene resin, is proposed.

Further, for example, a heat ray-shielding plate (see patent documents 3 and 4) wherein an inorganic fine particle such as mica coated with titanium oxide having a heat ray reflection capability or coated with titanium oxide is kneaded with a transparent resin such as acrylic resin and polycarbonate resin, is also proposed.

Also, as a heat ray-shielding sheet using polyvinyl chloride resin, patent document 5 proposes the heat ray-shielding sheet capable of preventing a temperature increase by solar ray inside of a sheet-like structure such as a tent, by reflecting the solar ray by a "reflection layer" of an outermost layer and effectively absorbing a transmitted light, which is not completely reflected, by an "absorption layer", in a lamination structure of the "reflection layer" and the "absorption layer", wherein the "reflection layer" contains at least one selected from glass beads, hollow glass balloon, and micro capsule, and titanium oxide-based white pigment mixed into the polyvinyl chloride resin, for reflecting a light having a specific wavelength; and the "absorption layer" contains at least one selected from polyvinyl chloride resin, acrylic resin, polyester resin, polyolefinic resin, and urethane resin, for absorbing a light transmitted through this reflection layer and having a wavelength that particularly contributes to heat generation.

Meanwhile, an applicant of the present invention focuses on hexaboride nanoparticles having a large quantity of free electrons as components having a heat ray-shielding effect, and has already proposed the heat ray-shielding resin sheet material (patent document 6) wherein the hexaboride nanoparticles are dispersed, or the hexaboride nanoparticles and ITO particles and/or ATO particles are dispersed into the polycarbonate resin and the acrylic resin.

In optical characteristics of the heat ray-shielding resin sheet material to which the hexaboride nanoparticles are singularly applied, or the hexaboride nanoparticles and ITO particles and/or ATO particles are applied, visible light transmittance is improved to 70% or more and solar light transmittance is improved to 50%, because the heat ray-shielding resin sheet material has a maximum transmittance in a visible ray region, and exhibits a strong absorption and hence a minimum transmittance in a near-infrared region.

Further, in patent document 7, the applicant of the present invention provides a masterbatch mainly composed of thermoplastic resin and a heat ray-shielding hexaboride material ($XB_6$, wherein X is at least one or more kinds of elements selected from La, Ce, Pr, Nd, Gd, Tb, Dy, Ho, Y, Sm, Eu, Er, Tm, Yb, Lu, Sr and Ca) capable of preparing the heat ray-shielding transparent resin molding of various shapes having a high heat ray-shielding function while maintaining an excellent visible light transmittance capability, without using a physical film-forming method at a high cost, and also proposes a heat ray-shielding transparent resin molding and a heat ray-shielding transparent laminate to which this masterbatch is applied.

Also, in patent document 8, the applicant of the present invention proposes an infrared ray absorption filter for a plasma display panel, which has a great near infrared ray absorption power and excellent in durability and can be manufactured at a low cost, when inorganic material nanoparticles improved in weatherability and capable of transmitting the light of the visible light region and shielding the light of the near infrared ray region, are composed of nanoparticles of tungsten oxide and composite tungsten oxide, with average dispersed particle size set to be 800 nm or less.

Patent document 1:
  Japanese Patent Laid Open Publication No. 06-256541
Patent document 2:
  Japanese Patent Laid Open Publication No. 06-264050
Patent document 3:
  Japanese Patent Laid Open Publication No. 02-173060
Patent document 4:
  Japanese Patent Laid Open Publication No. 05-78544
Patent document 5:
  Japanese Patent Laid Open Publication No. 2006-231869
Patent document 6:
  Japanese Patent Laid Open Publication No. 2003-327717
Patent document 7:
  Japanese Patent Laid Open Publication No. 2004-59875
Patent document 8:
  Japanese Patent Laid Open Publication No. 2006-154516

DISCLOSURE OF THE INVENTION

Problem to be solved by the Invention

As described above, a heat ray-shielding film is formed by depositing metal, etc, on a transparent resin film. Then, the heat ray-shielding plate, with a heat ray-reflection film bonded to a transparent molding such as glass, incurs high cost, because this heat ray reflection film itself is extremely expensive and a complicated process such as a bonding process is required. Further, a bonding property between the transparent molding and the reflection film is inferior, thus involving a problem that separation of the film is generated due to a change with elapse of time.

An apparatus requiring an atmosphere control such as setting an atmosphere in a high vacuum state with high precision is necessary in manufacture, for the heat ray-shielding plate formed by directly depositing metal, etc, on the surface of the transparent molding, thus involving a problem that mass-productivity is low and universal usability is poor.

In order to sufficiently shield the heat ray, a large quantity of near infrared ray absorbent agent must be mixed into the heat ray-shielding plate, etc, with an organic near infrared ray absorbent agent kneaded with the thermoplastic transparent resin such as polyethylene terephthalate resin. Then, when a large quantity of near infrared ray absorbent agent is mixed into the heat ray-shielding plate, there is a problem that a visible light transmittance capability is reduced this time. Further, since an organic compound is used as the near infrared ray absorbent agent, there is a difficulty in weatherability when applied to window materials, etc, of buildings and vehicles, which are always exposed to direct sun light.

In order to improve the heat ray-shielding capability, a large quantity of heat ray reflection particles needs to be added to the heat ray-shielding plate, with inorganic particles such as titanium oxide having the heat ray reflection capability kneaded with the transparent resin such as acrylic resin. However, with an increase of a mixing ratio of the heat ray reflection particles, there is a problem similar to the problem of the organic near infrared absorbent agent, such that the visible light transmittance capability is lowered. Therefore, although the visible light transmittance capability is improved when an addition amount of the heat ray reflection particles is reduced, a heat ray shielding capability is lowered this time. As a result, there is a problem that it is difficult to simultaneously satisfy the heat ray shielding capability and the visible light transmittance capability. Further, when a large quantity of heat ray reflection particles are mixed, there is also a problem from an aspect of strength, such that physical property of the transparent resin, being a molding, is deteriorated, and particularly impact resistance and toughness are deteriorated.

A heat ray shielding sheet is composed of a "reflection layer" made of polyvinyl chloride resin containing glass beads and a titanium oxide-based white pigment, and an "absorption layer" made of polyvinyl chloride resin, and a reflection function is a main function of the heat ray shielding sheet. Then, there is a problem similar to the problem of the aforementioned technique, because titanium oxide is contained. Further, there is also a problem that manufacture is not easy, since this heat ray-shielding sheet has a two-layer structure.

In order to solve the above-described problems, inventors of the present invention achieve a technique of imparting a heat ray-shielding function to a polyvinyl chloride film excellent in mechanical characteristics and cost performance, without damaging such characteristics and at a low cost.

Therefore, it is found by the inventors of the present invention that the heat ray-shielding function can be imparted to the polyvinyl chloride film at a low cost by directly adding nanoparticles of tungsten oxide and composite tungsten oxide into the polyvinyl chloride film and uniformly dispersing the nanoparticles therein. However, when this operation is performed, it is found that agglutination of nanoparticles occurs, and it is difficult to uniformly disperse the nanoparticles of the tungsten oxide and composite tungsten oxide into the polyvinyl chloride film.

In view of the above-described circumstances, the present invention is provided, and an object of the present invention is to provide a composition for manufacturing a heat ray-shielding polyvinyl chloride film that can be applied to a normal manufacturing step of the polyvinyl chloride film, and a manufacturing method of the same. Further object of the present invention is to provide the polyvinyl chloride film having a high heat ray-shielding function while maintaining an excellent visible light transmittance capability, by applying the composition for manufacturing the heat ray-shielding polyvinyl chloride film.

Means for Solving the Problem

As a result of strenuous efforts to solve the above-described problems, inventors of the present invention achieve a completely new concept of a composition for manufacturing a heat ray-shielding polyvinyl chloride film, with nanoparticles of tungsten oxide and composite tungsten oxide dispersed into a plasticizer for manufacturing a polyvinyl chloride film. This is a technique completely different from a conventional concept such that after dispersing particles having optical characteristics, such as tungsten oxide and composite tungsten oxide, into polyvinyl chloride resin already added with plasticizer, the particles are uniformly dispersed therein, or after particles having the optical characteristics are dispersed thereinto at the same time of the plasticizer, the particles are uniformly dispersed therein.

Namely, the nanoparticles are dispersed into the polyvinyl chloride resin, in a state of sufficiently dispersing the nanoparticles of the tungsten oxide, the composite tungsten oxide, and a plasticizer for manufacturing the polyvinyl chloride film, passing through the step of the composition for manufacturing the heat ray-shielding polyvinyl chloride. As a result, it appears that the nanoparticles of the tungsten oxide and composite tungsten oxide are uniformly dispersed into the polyvinyl chloride resin, while being assisted by an effect of "inhibiting the resin from being oriented regularly by intruding into a space of the resin, and maintaining an amorphous state even at a glass transition point or less".

Namely, by the inventors of the present invention, it is found that the composition for manufacturing the heat ray-shielding polyvinyl chloride film manufactured by mixing into an organic solvent, the plasticizer for manufacturing the polyvinyl chloride film into a dispersion liquid obtained by dispersing the tungsten oxide nanoparticles expressed by a general formula $WO_x$ (satisfying $2.45 \leq x \leq 2.999$) and/or the composite tungsten oxide nanoparticles expressed by a general formula $M_yWO_z$ (wherein M is one or more kinds of elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexaboride crystal structure, and thereafter removing the organic solvent until a concentration of the solvent is 5 wt % or less by a vacuum distillation method.

Then, the composition for manufacturing the heat ray-shielding polyvinyl chloride film is kneaded with the polyvinyl chloride resin, which is then molded into a film-shape by publicly-known methods such as extrusion and calendaring method. Whereby, it is found that the heat ray-shielding polyvinyl chloride film can be prepared, having a maximum transmittance in the visible ray region, and exhibiting a strong absorption in the near infrared region. The present invention is completed based on such a technical discovery.

Namely, in order to solve the above-described problems, first invention provides a manufacturing method of a composition for manufacturing a heat ray-shielding polyvinyl chloride film used for manufacturing a heat ray-shielding polyvinyl chloride film, including the steps of:

obtaining a dispersion liquid by dispersing tungsten oxide nanoparticles expressed by a general formula $WO_x$ (satisfying $2.45 \leq x \leq 2.999$) and/or the composite tungsten oxide nanoparticles expressed by a general formula $M_yWO_z$ (wherein M is one or more kinds of elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexaboride crystal structure, and a dispersant, into an organic solvent having a boiling point of 120° or less;

obtaining a mixture by mixing a plasticizer for manufacturing a polyvinyl chloride, into this dispersion liquid; and obtaining a composition for manufacturing the heat ray-shielding polyvinyl chloride film by using a vacuum distillation method and removing the organic solvent from this mixture until a concentration of the solvent is 5 wt % or less.

A second invention provides the manufacturing method of the composition for manufacturing the heat ray-shielding polyvinyl chloride film according to the first invention, wherein the organic solvent is at least one kind selected from toluene, methyl ethyl ketone, methyl isobutyl ketone, isopropyl alcohol, and ethanol.

A third invention provides the manufacturing method of the composition for manufacturing the heat ray-shielding polyvinyl chloride film according to the first invention or the second invention, wherein the plasticizer for manufacturing the polyvinyl chloride film is dioctyl phthalate or diisononyl phthalate.

A fourth invention provides a manufacturing method of the plasticizer for manufacturing the heat ray-shielding polyvinyl chloride film according to any one of the first to third inventions, wherein the tungsten oxide nanoparticles and the composite tungsten oxide nanoparticles are nanoparticles having an average particle size of 800 nm or less.

A fifth invention provides the manufacturing method of the composition for manufacturing the heat ray-shielding polyvinyl chloride film according to any one of the first to fourth inventions, wherein the tungsten oxide nanoparticles and the composite tungsten oxide nanoparticles are subjected to surface treatment by a compound containing one or more kinds of elements selected from Si, Ti, Zr, and Al.

A sixth invention provides a composition for manufacturing a heat ray-shielding polyvinyl chloride film containing: tungsten oxide nanoparticles expressed by a general formula $WO_x$ (satisfying $2.45 \leq x \leq 2.999$) and/or the composite tungsten oxide nanoparticles expressed by a general formula $M_yWO_z$ (wherein M is one or more kinds of elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexaboride crystal structure, a dispersant, a plasticizer for manufacturing a polyvinyl chloride film, and an organic solvent having concentration of 5 wt % or less.

A seventh invention provides the heat ray-shielding polyvinyl chloride film, which is manufactured by kneading the composition for manufacturing the heat ray-shielding polyvinyl chloride film according to claim 6, with polyvinyl chloride resin, and molding it into a film-shape.

ADVANTAGE OF THE INVENTION

According to the present invention, as a composition having a heat ray-shielding function, it is possible to obtain a composition for manufacturing a heat ray-shielding polyvinyl chloride film containing tungsten oxide nanoparticles expressed by a general formula $WO_x$ and/or composite tungsten oxide nanoparticles expressed by a general formula $M_yWO_z$ and having a hexaboride crystal structure, a dispersant, a plasticizer for manufacturing a polyvinyl chloride film, an organic solvent having a concentration of 5 wt % or less. Then, by kneading the composition for manufacturing the heat ray-shielding polyvinyl chloride film, with polyvinyl chloride resin and molding it into a film-shape, the heat ray-shielding polyvinyl chloride film can be prepared, having a maximum transmittance in a visible ray region, and exhibiting a strong absorption in a near infrared region.

BEST MODE FOR CARRYING OUT THE INVENTION

Preferred embodiments of the present invention will be described in detail hereinafter.

A composition for manufacturing a heat ray-shielding polyvinyl chloride film according to the present invention is obtained, in such a manner that tungsten oxide nanoparticles expressed by a general formula $WO_x$ (satisfying $2.45 \leq x \leq 2.999$) and/or composite tungsten oxide nanoparticles expressed by a general formula $M_yWO_x$ (wherein M is one or more kinds of elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexaboride crystal structure, are used as nanoparticles having a heat ray-shielding function, and nanoparticles having the heat ray-shielding function and a dispersant are dispersed into an organic solvent, to thereby obtain a dispersion liquid, and a plasticizer for manufacturing a polyvinyl chloride film is mixed into the obtained dispersion liquid, and the organic solvent is removed until a concentration of the solvent is 5 wt % or less by using a vacuum distillation method.

The composition for manufacturing the heat ray-shielding polyvinyl chloride film will be described in detail hereinafter.

(1) Nanoparticles Having the Heat Ray-Shielding Function

Nanoparticles having the heat ray-shielding function used in the composition for manufacturing the heat ray-shielding polyvinyl chloride film according to the present invention are tungsten oxide nanoparticles and/or composite tungsten oxide nanoparticles.

The tungsten oxide nanoparticles and the composite tungsten oxide nanoparticles absorb light in a near infrared region and particularly the light of 1000 nm or more is greatly absorbed. Therefore, its transmission color tone is a bluish color tone.

Particle sizes of the tungsten oxide nanoparticles and composite tungsten oxide nanoparticles can be suitably selected, according to a purpose of use.

For example, when used for an application of holding transparency, the tungsten oxide nanoparticles and the composite tungsten oxide nanoparticles have preferably a dispersed particle size of 800 nm or less. When the dispersed particle size is 800 nm or less, the light is not completely shielded by scattering, and visibility in a visible light region can be maintained, and simultaneously transparency can be efficiently maintained.

Particularly, when the transparency of the visible light region is emphasized, the scattering by particles is further preferably taken into consideration. Then, when reduction of the scattering by these nanoparticles is emphasized, the dispersed particle size of the tungsten oxide nanoparticles and the composite tungsten oxide nanoparticles are set to be 200 nm or less, or preferably set to be 100 nm or less.

This is because when the dispersed particle size is smaller, scattering of the light in a visible light region of wavelengths 400 nm to 780 nm is reduced, due to geometrically scattering or Mie scattering.

When the scattering of the light is reduced, a heat ray-shielding film is turned into a fogged glass, and it is possible to avoid such a situation that a sharp transparency can not be obtained. This is because when the dispersed particle size is 200 nm or less, the geometric scattering or the Mie scattering is reduced, and an area becomes a Rayleigh scattering area. In the Rayleigh scattering area, scattered lights are reduced in inverse proportion to $6^{th}$ power of the particle size, and therefore scattering is reduced with reduction of the dispersed particle size, and the transparency is improved. Further, when the dispersed particle size is 100 nm or less, the scattered lights are preferably extremely reduced. The dispersed particle size is preferably smaller, from a viewpoint of avoiding the scattering of the lights, and industrial manufacture is easy when the dispersed particle size is 1 nm or more.

(a) Tungsten Oxide Nanoparticles

As the tungsten oxide nanoparticles expressed by a general formula $WO_x$ (satisfying $2.45 \leq x \leq 2.999$), $W_{18}O_{49}$, $W_{20}O_{58}$, $W_4O_{11}$ can be given for example. When a value of x is 2.45 or more, it is possible to completely avoid a situation that a crystal phase of $WO_2$, being an outside of a purpose, appears in the heat ray-shielding material, and also chemical stability of a material can be obtained. Meanwhile, when the value of x is 2.999 or less, a sufficient amount of free electrons are generated and the tungsten oxide nanoparticles become an efficient heat ray-shielding material. When the value of x is 2.95 or less, the tungsten oxide nanoparticles are further preferable as the heat ray-shielding material. Note that $WO_x$ compound, with a range of x satisfying $2.45 \leq x \leq 2.999$, is contained in a compound called a so-called a magneli phase.

(b) Composite Tungsten Oxide Nanoparticles

As the composite tungsten oxide nanoparticles expressed by a general formula $M_yWO_z$ (wherein M is one or more kinds of elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexaboride crystal structure, $Cs_{0.33}WO_3$, $Rb_{0.33}WO_3$, $K_{0.33}WO_3$, $Ba_{0.33}WO_3$ can be given. However, when y and z are within the aforementioned range, useful heat ray-shielding characteristics can be obtained. An addition amount of added element M is preferably 0.1 or more and 0.5 or less, and is further preferably in the vicinity of 0.33. This is because a value theoretically calculated from the hexaboride crystal structure is 0.33, and preferable optical characteristics can be obtained by the addition amount around 0.33. Also, a range of Z is preferably set to be $2.2 \leq z \leq 3.0$. This is because even in a case of the composite tungsten oxide material expressed by $M_yWO_z$, a mechanism works, which is similar to the mechanism of the tungsten oxide material expressed by the aforementioned $WO_x$, and also in a range of $z \leq 3.0$, there is a supply of the free electrons by addition of the aforementioned element M. From the viewpoint of the optical characteristics, the range of z is more preferably set to be $2.2 \leq z \leq 2.99$, and further preferably set to be $2.45 \leq z \leq 2.99$.

(c) Manufacturing Method of the Tungsten Oxide Nanoparticles and Composite Tungsten Oxide Nanoparticles The aforementioned tungsten oxide nanoparticles expressed by a general formula $WO_x$ and composite tungsten oxide nanoparticles expressed by a general formula $M_yWO_z$ can be obtained by applying heat treatment to a tungsten compound starting raw material in an inert gas atmosphere or a. reductive gas atmosphere.

First, the tungsten compound starting raw material will be described.

The tungsten compound starting raw material is preferably one or more kinds selected from a tungsten trioxide powder, a tungsten dioxide powder or a hydrate of the tungsten oxide, or a tungsten hexachloride powder, or ammonium tungstate powder, or a hydrate powder of the tungsten oxide obtained by dissolving the tungsten hexachloride into alcohol and thereafter drying it, or a hydrate powder of the tungsten oxide obtained by dissolving the tungsten hexachloride into alcohol and adding water thereto to cause precipitation and drying it, or a tungsten compound powder obtained by drying the ammonium tungstate aqueous solution and a tungsten metal powder.

Here, when the tungsten oxide nanoparticles are manufactured, the hydrate powder of the tungsten oxide, the tungsten trioxide, or the tungsten compound powder obtained by drying the ammonium tungstate aqueous solution, are further preferably used from the viewpoint of facilitating the manufacturing steps.

Meanwhile, when the composite tungsten oxide nanoparticles are manufactured, the ammonium tungstate aqueous solution and the tungsten hexachloride solution are further preferably used, from the viewpoint that each element, with its starting raw material as a solution, can be easily uniformly mixed.

By using these raw materials, and by applying heat treatment thereto in the inert gas atmosphere and the reductive gas atmosphere, the tungsten oxide nanoparticles and the composite tungsten oxide nanoparticles having the aforementioned particle size can be obtained.

Further, the heat ray-shielding material nanoparticles containing the composite tungsten oxide nanoparticles expressed by a general formula $M_yWO_z$ containing the element M is similar to the tungsten compound starting raw material of the heat ray-shielding material nanoparticles containing the tungsten oxide nanoparticles expressed by the general formula $WO_x$, and further the element M is set as the starting raw material of the tungsten compound containing element M in a form of a simple body or a compound.

Here, in order to manufacture the starting raw material, with each component uniformly mixed in a molecular level, each raw material is preferably mixed in a solution, and the tungsten compound starting raw material containing element M can preferably be dissolved into water and a solvent such as an organic solvent. For example, tungstate, chloride, nitrate, sulfate, oxalate, oxide, carbonate, and hydroxide, etc, containing element M can be given for example. However, the tungsten compound starting raw material is not limited thereto, and is preferable if it is set in a solution state.

Next, heat treatment in the inert gas atmosphere or the reductive gas atmosphere will be described.

First, 650° C. or more is preferable as a heat treatment condition in the inert gas atmosphere. The starting raw material subjected to heat treatment at 650° C. or more has a sufficient near infrared ray absorption power and has a good efficiency as the heat ray-shielding nanoparticle. Inert gas such as Ar and $N_2$ is preferably used as the inert gas.

As the heat treatment condition in the reductive atmosphere, it is preferable that the starting raw material is first subjected to heat treatment at 100° C. or more and 650° C. or less in the reductive gas atmosphere, and then subjected to heat treatment at 650° C. or more and 1200° C. or less in the inert gas atmosphere. The reductive gas at this time is not particularly limited, but $H_2$ is preferable. Then, when $H_2$ is used as the reductive gas, as the composition of the reductive atmosphere, for example, $H_2$ is preferably mixed into the inert gas such as Ar and $N_2$ in a volume ratio of 0.1% or more, and further preferably mixed thereinto in a volume ratio of 0.2% or more. When $H_2$ is 0.1% or more in the volume ratio, reduction can be advanced efficiently.

The starting raw material powder reduced by hydrogen contains the magneli phase and shows excellent heat ray-shielding characteristics. Accordingly, in this state also, this starting raw material powder can be used as the heat ray-shielding nanoparticle.

It is preferable that surface treatment is applied to surfaces of the tungsten oxide nanoparticles and the composite tungsten oxide nanoparticles of the present invention in such a manner as being coated with a compound or preferably an oxide containing one or more kinds of elements selected from Si, Ti, Zr, and Al, from the viewpoint of improving weatherability.

In addition, in order to obtain a desired composition for manufacturing the heat ray-shielding polyvinyl chloride film, it is desirable that powder colors of the tungsten oxide nanoparticles and the composite tungsten oxide nanoparticles satisfy conditions that $L^*$ is set to be 25 to 80, $a^*$ is set to be −10 to 10, and $b^*$ is set to be −15 to 15 in the powder colors in a $L^*a^*b^*$ color system recommended by Commission, internationale de l'eclairage (CIE).

By using the tungsten oxide nanoparticles and the composite tungsten oxide nanoparticles having the powder colors, the heat ray-shielding polyvinyl chloride film having excellent optical characteristics can be obtained.

(2) Dispersant

As a dispersant used in the heat ray-shielding polyvinyl chloride film of the present invention, the dispersant having a thermal decomposition temperature of 200° C. or more measured by a simultaneous measuring device for differential heat and thermal gravitation, and also having acrylic and styrene main chains, is preferable.

This is because the dispersant is not decomposed during kneading with the polyvinyl chloride resin, if the thermal decomposition temperature is 200° C. or more. Also, this is because it is possible to avoid a situation such as browning of the heat ray-shielding polyvinyl chloride film due to decomposition of the dispersant, deterioration of the visible light transmittance, and impossibility to obtain original optical characteristics.

Further, as the dispersant, the dispersant having a hydroxyl group, a carboxy group, or an epoxy group as functional groups. These functional groups have effects such that they are adsorbed on surfaces of the tungsten oxide nanoparticles and the composite tungsten oxide nanoparticles, thereby preventing agglutination of the tungsten oxide nanoparticles and the composite tungsten oxide nanoparticles, and uniformly dispersing these nanoparticles in the plasticizer for manufacturing the polyvinyl chloride film or the obtained polyvinyl chloride film. Specifically, an acrylic-styrene copolymer dispersant having the hydroxyl group as a functional group, and an acrylic-styrene copolymer dispersant having the carboxy group as the functional group, can be given as examples.

Further, an addition amount of this dispersant is preferably set in a range of 0.1 to 4 times, and more preferably set in a range of 0.3 to 2.5 times, in a weight ratio to the tungsten oxide nanoparticles and/or the composite tungsten oxide nanoparticles. This is because when the addition amount of the dispersant is set in the aforementioned range, the tungsten oxide nanoparticles and the composite tungsten nanoparticles are uniformly dispersed in the plasticizer for manufacturing the polyvinyl chloride film, thus having no adverse influence on physical properties of the obtained polyvinyl chloride resin.

(3) Organic Solvent

As the organic solvent used in the composition for manufacturing the heat ray-shielding polyvinyl chloride film of the present invention, the organic solvent having a boiling point of 120° C. or less is preferably used.

If the boiling point is 120° C. or less, the organic solvent can be easily removed by vacuum distillation. As a result, removal of the organic solvent is progressed rapidly in the step of vacuum distillation, and this contributes to a productivity of the composition for manufacturing the heat ray-shielding polyvinyl chloride film. Further, the step of vacuum distillation is progressed easily and sufficiently, and therefore it is possible to avoid a situation that an excessive organic solvent remains in the composition for manufacturing the heat ray-shielding polyvinyl chloride film of the present invention. As a result, it is possible to avoid a situation that trouble such as generation of air bubbles occur during molding the polyvinyl chloride film. Specifically, toluene, methyl ethyl ketone, methyl isobutyl ketone, isopropyl alcohol, and ethanol can be given as examples. However, the organic solvent capable of uniformly dispersing the nanoparticles having the boiling point of 120° C. or less and having the heat ray-shielding function can be arbitrarily selected.

(4) Plasticizer for Manufacturing the Polyvinyl Chloride Film

The plasticizer used in the composition for manufacturing the heat ray-shielding polyvinyl chloride film of the present invention is preferably an ester compound synthesized from acid and alcohol. Phthalic acid, trimellitic acid, adipic acid, phosphoric acid, citric acid, can be given as the aforementioned acid. Also, octanol, butanol, nonanol, and high-grade mixed alcohol can be given as the aforementioned alcohol.

Particularly, phthalic acid ester has various properties such as compatibility with polyvinyl chloride and cold resistance, and also has excellent processability and high economic efficiency, and therefore is preferable. Dioctyl phthalate or diisononyl phthalate can be given as typical phthalic acid ester.

(5) A Dispersion Method of Nanoparticles Having the Heat Ray-Shielding Function into the Organic Solvent A method for dispersing the aforementioned tungsten oxide nanoparticles and composite tungsten oxide nanoparticles into the organic solvent will be described hereinafter.

The method for dispersing the tungsten oxide nanoparticles and the composite tungsten oxide nanoparticles into the organic solvent can be arbitrarily selected if it is a method for uniformly dispersing the nanoparticles into the organic solvent. For example, beads-milling, ball-milling, sand-milling, and ultrasonic dispersion can be used.

The concentration of the tungsten oxide nanoparticles and/or composite tungsten oxide nanoparticles in the organic solvent is desirably set to be 5 to 50 wt %. This is because when it is set to be 5 wt % or more, an amount of the organic solvent that should be removed is excessively increased, and it is possible to avoid a situation such as a high manufacturing cost, and also when it is 50 wt % or less, it is possible to avoid a situation that agglutination of the nanoparticles occurs easily and the nanoparticles are hardly dispersed, or viscosity of liquid is remarkably increased, thus making it difficult to handle such a liquid.

(6) An Addition Method of the Plasticizer for Manufacturing the Polyvinyl Chloride Film The tungsten oxide nanoparticles and/or the composite tungsten oxide nanoparticles, and the dispersant are dispersed into the organic solvent, and thereafter the plasticizer for manufacturing the polyvinyl chloride film is added to this dispersion liquid, which are then mixed by using a general stirring and mixing device.

(7) An Organic Solvent Removing Method

As an organic solvent removing method for obtaining the composition for manufacturing the polyvinyl chloride film of the present invention, a method for vacuum-distilling the obtained mixture is preferable. Specifically, in the vacuum-distillation method, the aforementioned mixture is subjected to vacuum-distillation while being stirred, to thereby separate the composition for manufacturing the heat ray-shielding polyvinyl chloride film, and an organic solvent component. As an apparatus used in the vacuum-distillation, a vacuum stirring-type drier can be given for example. However, an apparatus having the aforementioned function may be acceptable, and the apparatus is not particularly limited.

By using such a vacuum-distillation method, removing efficiency of a solvent is improved, and also the composition for manufacturing the aforementioned heat ray-shielding polyvinyl chloride film is not exposed to a high temperature for a long time, thus allowing no agglutination to occur in the dispersed nanoparticles, and which is preferable. Further, productivity is improved, and an evaporated organic solvent can be easily recovered, and this is preferable from the viewpoint of environmental consideration.

(8) Other Additive Agent

Further, a general additive agent can also be mixed into the composition for manufacturing the heat ray-shielding polyvinyl chloride film of the present invention. For example, dyes and pigments generally used in coloring of the thermoplastic resin such as azine-based dyes, cyanine-based dyes, quinoline-based dyes, perylene-based dyes, and carbon black, for exhibiting an arbitrary color tone as needed, may also be added: A hindered phenol-based and phosphorus stabilizer, a mold release agent, hydroxybenzophenone-based, salicylic-based, HALS-based, triazole-based, and triazine-based organic ultraviolet ray absorbents, inorganic ultraviolet ray absorbents such as zinc oxide, titanium oxide, and cerium oxide, a coupling agent, a surface-active agent, and an anti-static agent can also be used as additive agents.

(9) Heat Ray-Shielding Polyvinyl Chloride Film

The heat ray-shielding polyvinyl chloride film according to the present invention will be described hereinafter.

The heat ray-shielding polyvinyl chloride film of the present invention will be obtained by kneading the aforementioned composition for manufacturing the heat ray-shielding polyvinyl chloride film, with the polyvinyl chloride resin, and thereafter molding it into a film shape by publicly-known methods such as extrusion and calendaring method.

The heat ray-shielding polyvinyl chloride film of the present invention can be used in such a manner as being affixed to construction materials such as a window glass and an arcade, and also can be used in the construction materials in such a manner as being affixed to transparent moldings such as inorganic glass, resin glass, and a resin film by a suitable method, as an integral heat ray-shielding transparent laminate. For example, by affixing the heat ray-shielding polyvinyl chloride film to the inorganic glass, the heat ray-shielding transparent laminate having the heat ray-shielding function and an anti-scattering function can be obtained. The heat ray-shielding transparent laminate can be used as a more useful construction material by complementing mutual defects, while effectively exhibiting mutual advantages of the moldings.

As described above in detail, the composition for manufacturing the heat ray-shielding polyvinyl chloride film can be obtained by mixing the plasticizer for manufacturing the polyvinyl chloride film into the dispersion liquid obtained by dispersing the tungsten oxide nanoparticles, being heat ray-shielding components, and/or the composite tungsten oxide nanoparticles and the dispersant into the organic solvent having the boiling point of 120° C. or less, and thereafter removing this organic solvent until the concentration of the solvent is 5 wt % or less by using the vacuum-distillation method. Then, this composition for manufacturing the heat ray-shielding polyvinyl chloride film and the polyvinyl chloride resin are kneaded with each other, and are molded into a film-shape by a publicly-known method, thereby making it possible to provide the heat ray-shielding polyvinyl chloride film having a maximum transmittance in the visible ray region and exhibiting a strong absorption in the near infrared region.

EXAMPLES

Examples of the present invention will be specifically described hereinafter together with comparative examples.

However, the present invention is not limited to the examples.

Further, in each example, the powder colors (10° visual field, light source D65) of the tungsten oxide nanoparticles and the composite tungsten oxide nanoparticles, and the visible light transmittance and solar light transmittance of the heat ray-shielding polyvinyl chloride film were measured by using a spectrophotometer U-4000 produced by HITACHI LTD.

Note that the solar light transmittance is an index showing the heat ray-shielding capability of the heat ray-shielding polyvinyl chloride film.

In addition, a haze value was measured based on YIS K 7105, by using HR-200 produced by MURAKAMI COLOR RESEARCH LABORATORY.

Example 1

A quartz boat, with $H_2WO_4$ 50 g put therein, was set in a quartz tubular furnace, which was then heated while supplying 5% of $H_2$ gas, with $N_2$ gas as a carrier and subjected to reduction treatment for 1 hour at a temperature of 600° C., and thereafter was sintered for 30 minutes at 800° C. in an atmosphere of $N_2$ gas, to thereby obtain a particle (abbreviated as a particle "a" hereinafter). As the powder color of this particle "a", $L^*$ was 36.9288, $a^*$ was 1.2573, and $b^*$ was −9.1526, and as a result of identification of a crystal phase by powder X-ray diffraction, the crystal phase of $W_{18}O_{49}$ was observed.

Next, 6 wt % of particle "a", 12 wt % of acrylic dispersant having the hydroxyl group as the functional group, and 82 wt % of toluene were weighed, which were then subjected to pulverization/dispersion treatment for 6 hours by a paint shaker, with 0.3 mmφ of $ZrO_2$ beads put therein, to thereby adjust a tungsten oxide nanoparticles dispersion liquid (abbreviated as liquid A hereinafter).

Further, 82 wt % of dioctyl phthalate was added and mixed into 100 wt % of liquid A, which was then subjected to vacuum distillation by heating for 1 hour at 80° C., by being heated for 1 hour at 80° C. using a stirring type vacuum drier (universal mixer produced by TSUKISHIMA KIKAI CO. LTD.) and toluene is removed, to thereby obtain the composition for manufacturing the heat ray-shielding polyvinyl chloride film (abbreviated as composition A hereinafter) of the example 1.

Here, when a residual amount of toluene in the composition A was measured by a dry-type moisture meter, it was 3.5 wt %. Further, when the dispersed particle size of the tungsten oxide nanoparticles in the composition A was measured by a particle size distribution meter produced by OTSUKA ELECTRONICS CO, LTD., it was 77 nm.

Next, 6.7 wt % of the obtained composition A, 33.3% of DOP, 60 wt % of polyvinyl chloride resin were mixed, and kneaded for 15 minutes at 150° C. using two rolls, to thereby obtain the heat ray-shielding polyvinyl chloride film (abbreviated as film A hereinafter) of an example 1 having a film thickness of 0.3 mm, by a calender roll method.

As shown in table 1, the optical characteristics of the film A are as follows. The solar light transmittance was 40.5% when the visible light transmittance was 60.1%, and the haze value was 2.3%. Such results were show in table 1.

Example 2

The composition for manufacturing the heat ray-shielding polyvinyl chloride film of an example 2 (abbreviated as composition B hereinafter) was obtained in the same way as the example 1, excluding a point that methyl ethyl ketone was used as the organic solvent. Here, when the amount of the residual methyl ethyl ketone of the composition B was measured by the dry-type moisture meter, it was 3.7 wt %. Also, when the dispersed particle size of the tungsten oxide nanoparticles in the composition B was measured by the particle size distribution meter produced by OTSUKA ELECTRONICS CO. LTD., it was 83 nm.

Next, the heat ray-shielding polyvinyl chloride film of the example 2 (abbreviated as film B hereinafter) was obtained, in the same way as the example 1 excluding a point that the obtained composition B was used.

As shown in table 1, the optical characteristics of the film B were as follows. The solar light transmittance was 41.1% when the visible light transmittance was 60.8%, and the haze value was 2.2%. Such results were shown in table 1.

Example 3

Powders obtained by sufficiently mixing 50 g of $H_2WO_4$ and 17.0 g of $Cs(OH)_2$ (corresponding to Cs/W=0.3) by an agate mortar, were heated while supplying 5% of $H_2$ gas, with $N_2$ gas as carrier, and subjected to reduction treatment for 1 hour at a temperature of 600° C., and thereafter sintered for 30 minutes at 800° C. in $N_2$ gas atmosphere, to thereby obtain a particle (abbreviated as particle "b" hereinafter). The composition formula of the particle "b" was $Cs_{0.3}WO_3$, and as the powder color, $L^*$ was 35.2745, $a^*$ was 1.4918, and $b^*$ was −5.3118.

Next, the tungsten oxide nanoparticle dispersion liquid of an example 3 (abbreviated as liquid C hereinafter) was adjusted in the same way as the example 1, excluding a point that the particle "b" was used. Then, the composition for manufacturing the heat ray-shielding polyvinyl chloride film (abbreviated as composition C hereinafter) was obtained in the same way as the example 1, excluding a point that the liquid C was used. Here, when the amount of the residual toluene of the composition C was measured by a dry-type moisture meter, it was 3.2 wt %. Further, when the dispersed particle size of the tungsten oxide nanoparticles in the composition C was measured by the particle size distribution meter produced by OTSUKA ELECTRONICS CO, LTD., it was 90 nm.

Next, the heat ray-shielding polyvinyl chloride film of the example 3 (abbreviated as film C hereinafter) was obtained in the same way as the example 1, excluding a point that the obtained composition C was used.

As shown in table 1, the optical characteristics of the film C were as follows. The solar light transmittance was 34.8% when the visible light transmittance was 69.9%, and the haze value was 2.2%. Such results are shown in table 1.

Example 4

Methyltrimethoxysilane was added to the liquid C, which was then stirred and mixed for 1 hour by a mechanical stirrer, and toluene was removed by using a spread drier, to thereby obtain the composite tungsten oxide nanoparticle (particle "c") subjected to surface treatment by a silane compound. Then, the composition for manufacturing the heat ray-shielding polyvinyl chloride film of an example 4 (abbreviated as composition D hereinafter) was obtained in the same way as the example 1, excluding a point that the particle "c" was used. Here, when the amount of residual toluene of the composition D was measured by the dry-type moisture meter, it was 3.5 wt %. In addition, when the dispersed particle size of the tungsten oxide nanoparticle was measured by the particle size distribution meter produced by OTSUKA ELECTRONICS CO, LTD., it was 85 nm.

Next, the heat ray-shielding polyvinyl chloride film of an example 4 (abbreviated as film D hereinafter) was obtained in the same way as the example 1, excluding a point that the obtained composition D was used.

As shown in table 1, the optical characteristics of the film D were as follows. The solar light transmittance was 33.1% when the visible light transmittance was 68.8%, and the haze value was 2.9%. Such results are shown in table 1.

Comparative Example 1

The composition for manufacturing the heat ray-shielding polyvinyl chloride film (abbreviated as composition E hereinafter) was obtained in the same way as the example 1, excluding a point that toluene was removed by stirring for 12 hours in a normal pressure and at 80° C., without using the vacuum stirring-type drier capable of performing vacuum distillation. Here, when the amount of the residual toluene of the composition E was measured by the dry-type moisture meter, it was 8.1 wt %. Moreover, when the dispersed particle size of the tungsten oxide nanoparticle in the composition E was measured by the particle size distribution meter produced by OTSUKA ELECTRONICS CO, LTD., it was 180 nm. Next, the heat ray-shielding polyvinyl chloride film of a comparative example 1 (abbreviated as film E hereinafter) was obtained in the same way as the example 1, excluding a point that the obtained E was used.

Since there were much residual toluene of the used composition E which was 8.1 wt %, the residual toluene could not be sufficiently removed during kneading with the polyvinyl chloride resin, and air bubbles were observed in the film E, thus providing a not so excellent outer appearance.

As shown in table 1, the optical characteristics of the film E were as follows. The solar light transmittance was 36.2% when the visible light transmittance was 68.8%, and the haze value was 10.2%. It appears that this is because toluene was removed by heating for a long time at a normal pressure, without using the vacuum stirring-type drier, and therefore agglutination of the nanoparticles occurs, thereby raising the haze value and losing transparency. Such results are shown in table 1.

TABLE 1

|  |  | Visible light transmittance (%) | Solar light transmittance (%) | Haze (%) |
|---|---|---|---|---|
| Example 1 | Film A | 60.1 | 40.5 | 2.3 |
| Example 2 | Film B | 60.8 | 41.1 | 2.2 |
| Example 3 | Film C | 69.9 | 34.8 | 2.2 |
| Example 4 | Film D | 68.8 | 33.1 | 2.9 |
| Comparative example 1 | Film E | 68.8 | 36.2 | 10.2 |

Evaluation of Examples 1 to 4 and Comparative Example 1

In examples 1 to 4, by using the vacuum-type stirring drier, the residual amount of the organic solvent was set in a range of 5 wt % or less. Therefore, films A to D with excellent outer appearance can be obtained without air bubbles in the films. Also, by using the vacuum-type stirring drier, the organic solvent can be removed in a short time, then the agglutination of the nanoparticles due to excessive heating for a long time can be prevented, and transparent films A to D with low haze values can be obtained. Meanwhile, in the comparative example 1, the organic solvent is removed by heating and stirring at a normal pressure, and therefore the residual amount of the organic solvent is increased from 5 wt %. Accordingly, the residual toluene can not be sufficiently removed during kneading, and the air bubbles are observed in the film E, thus providing not so excellent outer appearance. Also, in order to remove the organic solvent, long time heating is applied without using the drier, and therefore agglutination of the nanoparticles occurs, thus raising the haze value of the obtained film E and losing the transparency.

What is claimed is:

1. A manufacturing method of a composition for manufacturing a heat ray-shielding polyvinyl chloride film used for manufacturing a heat ray-shielding polyvinyl chloride film, comprising the steps of:
    obtaining a dispersion liquid by dispersing tungsten oxide nanoparticles expressed by a general formula $WO_x$ (satisfying $2.45 \leq x \leq 2.999$) and/or the composite tungsten oxide nanoparticles expressed by a general formula $M_yWO_z$ (wherein M is one or more kinds of elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexaboride crystal structure, and a dispersant, into an organic solvent having a boiling point of 120° or less;
    obtaining a mixture by mixing a plasticizer for manufacturing a polyvinyl chloride, into this dispersion liquid; and
    obtaining a composition for manufacturing the heat ray-shielding polyvinyl chloride film by using a vacuum distillation method and removing the organic solvent from this mixture until a concentration of the solvent is 5 wt % or less.

2. The manufacturing method of the composition for manufacturing the heat ray-shielding polyvinyl chloride film according to claim 1, wherein the tungsten oxide nanoparticles and the composite tungsten oxide nanoparticles are subjected to surface treatment by a compound containing one or more kinds of elements selected from Si, Ti, Zr, and Al.

3. A manufacturing method of a composition for manufacturing the heat ray-shielding polyvinyl chloride film according to claim 1, wherein the tungsten oxide nanoparticles and the composite tungsten oxide nanoparticles are particles having an average particle size of 800 nm or less.

4. The manufacturing method of the composition for manufacturing the heat ray-shielding polyvinyl chloride film according to claim 3, wherein the tungsten oxide nanoparticles and the composite tungsten oxide nanoparticles are subjected to surface treatment by a compound containing one or more kinds of elements selected from Si, Ti, Zr, and Al.

5. The manufacturing method of the composition for manufacturing the heat ray-shielding polyvinyl chloride film according to claim 1, wherein the plasticizer for manufacturing the polyvinyl chloride film is dioctyl phthalate or diisononyl phthalate.

6. The manufacturing method of the composition for manufacturing the heat ray-shielding polyvinyl chloride film according to claim 5, wherein the tungsten oxide nanoparticles and the composite tungsten oxide nanoparticles are subjected to surface treatment by a compound containing one or more kinds of elements selected from Si, Ti, Zr, and Al.

7. A manufacturing method of the plasticizer for manufacturing the heat ray-shielding polyvinyl chloride film according to claim 5, wherein the tungsten oxide nanoparticles and the composite tungsten oxide nanoparticles are particles having an average particle size of 800 nm or less.

8. The manufacturing method of the composition for manufacturing the heat ray-shielding polyvinyl chloride film according to claim 7, wherein the tungsten oxide nanoparticles and the composite tungsten oxide nanoparticles are subjected to surface treatment by a compound containing one or more kinds of elements selected from Si, Ti, Zr, and Al.

9. The manufacturing method of the composition for manufacturing the heat ray-shielding polyvinyl chloride film according to claim 1, wherein the organic solvent is at least one kind selected from toluene, methyl ethyl ketone, methyl isobutyl ketone, isopropyl alcohol, and ethanol.

10. The manufacturing method of the composition for manufacturing the heat ray-shielding polyvinyl chloride film according to claim 9, wherein the tungsten oxide nanoparticles and the composite tungsten oxide nanoparticles are subjected to surface treatment by a compound containing one or more kinds of elements selected from Si, Ti, Zr, and Al.

11. A manufacturing method of the plasticizer for manufacturing the heat ray-shielding polyvinyl chloride film according to claim 9, wherein the tungsten oxide nanoparticles and the composite tungsten oxide nanoparticles are particles having an average particle size of 800 nm or less.

12. The manufacturing method of the composition for manufacturing the heat ray-shielding polyvinyl chloride film according to claim 11, wherein the tungsten oxide nanoparticles and the composite tungsten oxide nanoparticles are subjected to surface treatment by a compound containing one or more kinds of elements selected from Si, Ti, Zr, and Al.

13. The manufacturing method of the composition for manufacturing the heat ray-shielding polyvinyl chloride film according to claim 9, wherein the plasticizer for manufacturing the polyvinyl chloride film is dioctyl phthalate or diisononyl phthalate.

14. The manufacturing method of the composition for manufacturing the heat ray-shielding polyvinyl chloride film according to claim 13, wherein the tungsten oxide nanoparticles and the composite tungsten oxide nanoparticles are subjected to surface treatment by a compound containing one or more kinds of elements selected from Si, Ti, Zr, and Al.

15. A manufacturing method of the plasticizer for manufacturing the heat ray-shielding polyvinyl chloride film according to claim 13, wherein the tungsten oxide nanoparticles and the composite tungsten oxide nanoparticles are particles having an average particle size of 800 nm or less.

16. The manufacturing method of the composition for manufacturing the heat ray-shielding polyvinyl chloride film according to claim 15, wherein the tungsten oxide nanoparticles and the composite tungsten oxide nanoparticles are subjected to surface treatment by a compound containing one or more kinds of elements selected from Si, Ti, Zr, and Al.

17. A composition for manufacturing a heat ray-shielding polyvinyl chloride film containing:
tungsten oxide nanoparticles expressed by a general formula $WO_x$ (satisfying $2.45<x<2.999$) and/or the composite tungsten oxide nanoparticles expressed by a general formula $M_yWO_z$ (wherein M is one or more kinds of elements selected from Cs, Rb, K, Tl, In, Ba, Li, Ca, Sr, Fe, Sn, Al, and Cu, satisfying $0.1<y<0.5$, $2.2<z<3.0$) and having a hexaboride crystal structure,
a dispersant,
a plasticizer for manufacturing a polyvinyl chloride film, and
an organic solvent having a boiling point of 120° C. or less and having concentration of 5 wt % or less.

18. The heat ray-shielding polyvinyl chloride film, which is manufactured by kneading the composition for manufacturing the heat ray-shielding polyvinyl chloride film according to claim 17, with polyvinyl chloride resin, and molding it into a film-shape.

* * * * *